(12) United States Patent
Okumura et al.

(10) Patent No.: US 10,974,661 B2
(45) Date of Patent: Apr. 13, 2021

(54) DECORATIVE PART FOR VEHICLE AND METHOD FOR MANUFACTURING SAME

(71) Applicant: TOYODA GOSEI CO., LTD., Kiyosu (JP)

(72) Inventors: Koji Okumura, Kiyosu (JP); Hideto Maeda, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 88 days.

(21) Appl. No.: 16/342,064

(22) PCT Filed: Sep. 14, 2017

(86) PCT No.: PCT/JP2017/033315
§ 371 (c)(1),
(2) Date: Apr. 15, 2019

(87) PCT Pub. No.: WO2018/074118
PCT Pub. Date: Apr. 26, 2018

(65) Prior Publication Data
US 2019/0232886 A1     Aug. 1, 2019

(30) Foreign Application Priority Data

Oct. 21, 2016   (JP) .............................. JP2016-207079
Oct. 21, 2016   (JP) .............................. JP2016-207080

(51) Int. Cl.
*B60R 13/00*     (2006.01)
*H01Q 1/42*     (2006.01)
*G01S 13/931*     (2020.01)
*H01Q 1/02*     (2006.01)
(Continued)

(52) U.S. Cl.
CPC .............. *B60R 13/005* (2013.01); *G01S 7/03* (2013.01); *G01S 13/931* (2013.01); *H01Q 1/02* (2013.01);
(Continued)

(58) Field of Classification Search
None
See application file for complete search history.

(56) References Cited

U.S. PATENT DOCUMENTS

| 6,175,335 B1 | 1/2001 | Ishikawa et al. |
| 2002/0044101 A1 | 4/2002 | Zimmermann |
(Continued)

FOREIGN PATENT DOCUMENTS

| DE | 10149337 A1 | 4/2003 |
| DE | 102012105564 A1 | 1/2014 |
(Continued)

OTHER PUBLICATIONS

Extended European Search Report dated May 14, 2020 issued in corresponding EP patent application No. 17861826.0.
(Continued)

*Primary Examiner* — Lori L Lyjak
(74) *Attorney, Agent, or Firm* — Posz Law Group, PLC

(57) ABSTRACT

A vehicle decorative part includes a decorative main body and a heater. The decorative main body is configured to be attached to a vehicle at a front side in a transmission direction of millimeter waves from a millimeter wave radar and has a millimeter wave transparency. The heater has a heating element that emits heat when energized. At least a part of the heating element is located in an irradiation region of the millimeter waves in the heater. As a millimeter wave attenuation reducing configuration that reduces attenuation of the millimeter waves passing through the heater, the heating element is incorporated in the heater in a condition where an area proportion of an area of a section of the heating element that occupies the irradiation region to an area of the irradiation region is set such that an attenuation amount of the millimeter waves is less than or equal to a permissible value.

9 Claims, 8 Drawing Sheets

(51) Int. Cl.
 H01Q 1/44 (2006.01)
 G01S 7/03 (2006.01)
(52) U.S. Cl.
 CPC .............. *H01Q 1/42* (2013.01); *H01Q 1/422* (2013.01); *H01Q 1/44* (2013.01)

(56) References Cited

U.S. PATENT DOCUMENTS

2005/0115943 A1 6/2005 Winter et al.
2011/0140984 A1* 6/2011 Suematsu ................ H01Q 1/42
 343/872
2014/0354465 A1 12/2014 Lee et al.

FOREIGN PATENT DOCUMENTS

| DE | 10 2015 004 204 A1 | 8/2015 |
|---|---|---|
| EP | 0 969 550 A1 | 1/2000 |
| EP | 2293382 A1 | 3/2011 |
| JP | S60-173084 U | 11/1985 |
| JP | H10-56309 A | 2/1998 |
| JP | H10-132921 A | 5/1998 |
| JP | 2000-022437 A | 1/2000 |
| JP | 2002-022821 A | 1/2002 |
| JP | 2002-131413 A | 5/2002 |
| JP | 2004-020514 A | 1/2004 |
| JP | 2004-138572 A | 5/2004 |

OTHER PUBLICATIONS

International Search Report of the International Searching Authority dated Dec. 5, 2017 for the corresponding international application No. PCT/JP2017/033315 (and English translation).
Extended European Search Report dated Oct. 4, 2019 issued in corresponding EP patent application No. 19178762.1.

\* cited by examiner

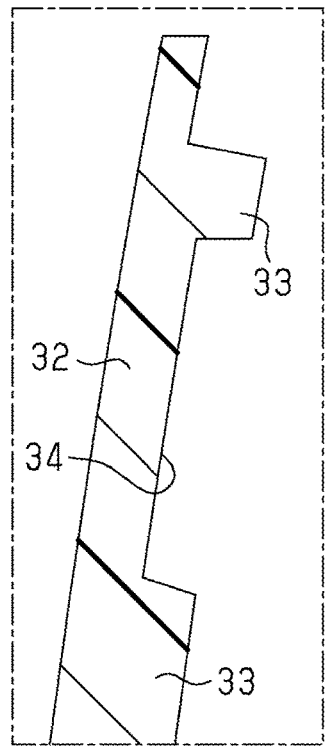
Fig.6A
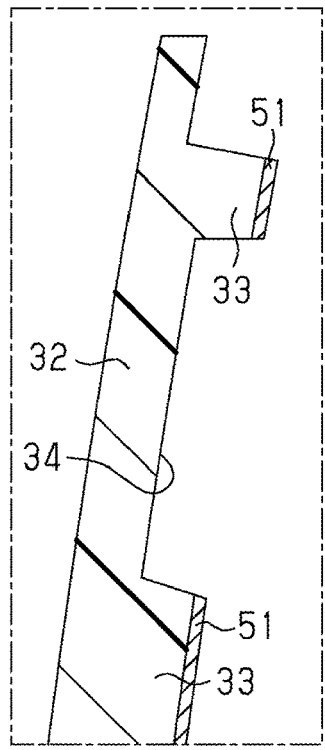
Fig.6B
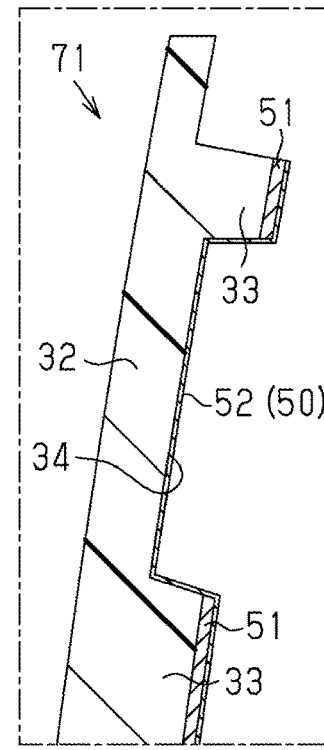
Fig.6C
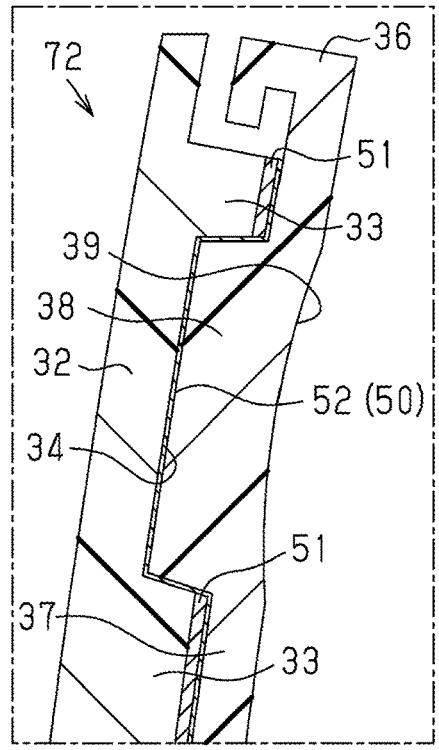
Fig.6D
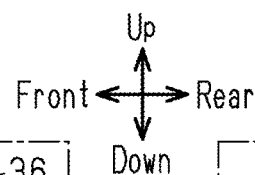
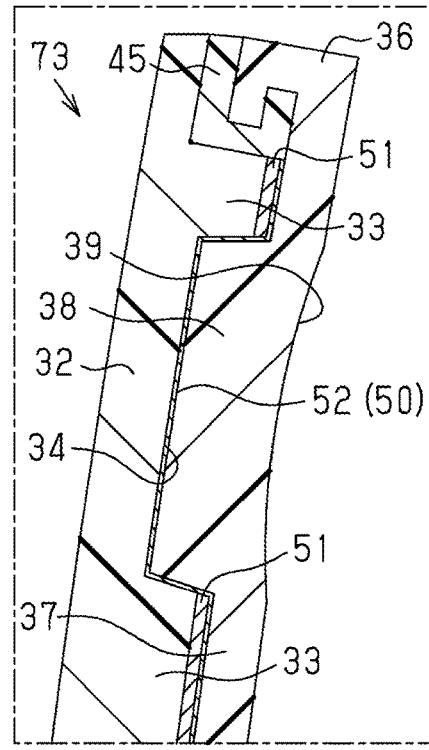
Fig.6E

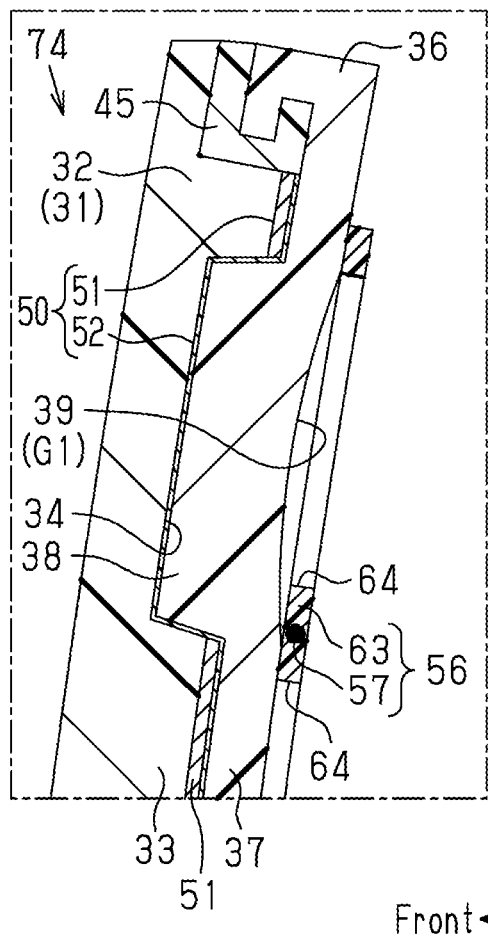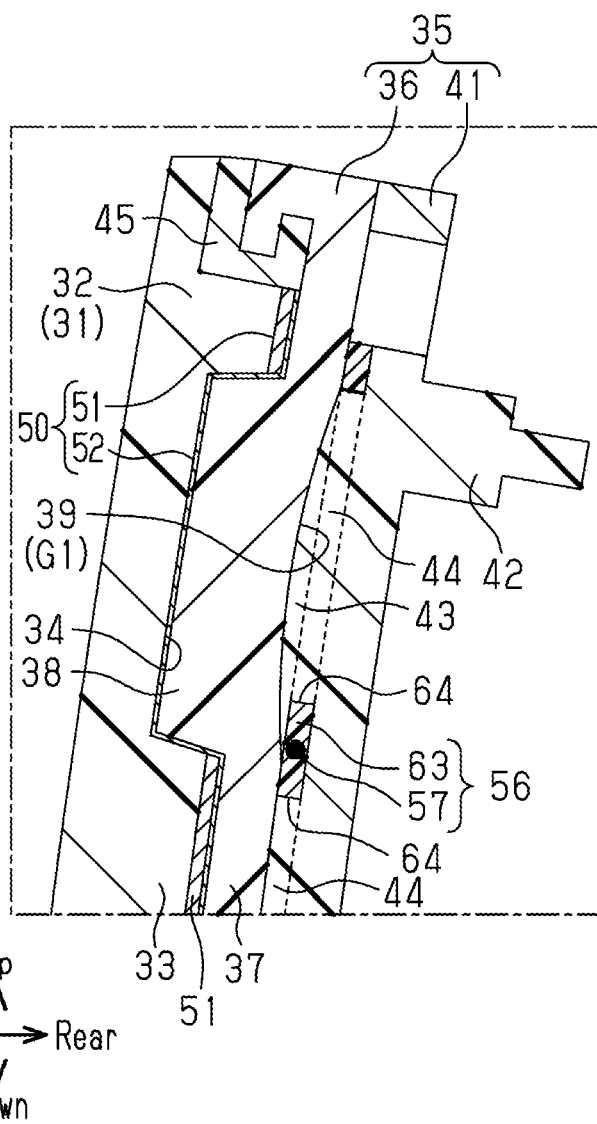

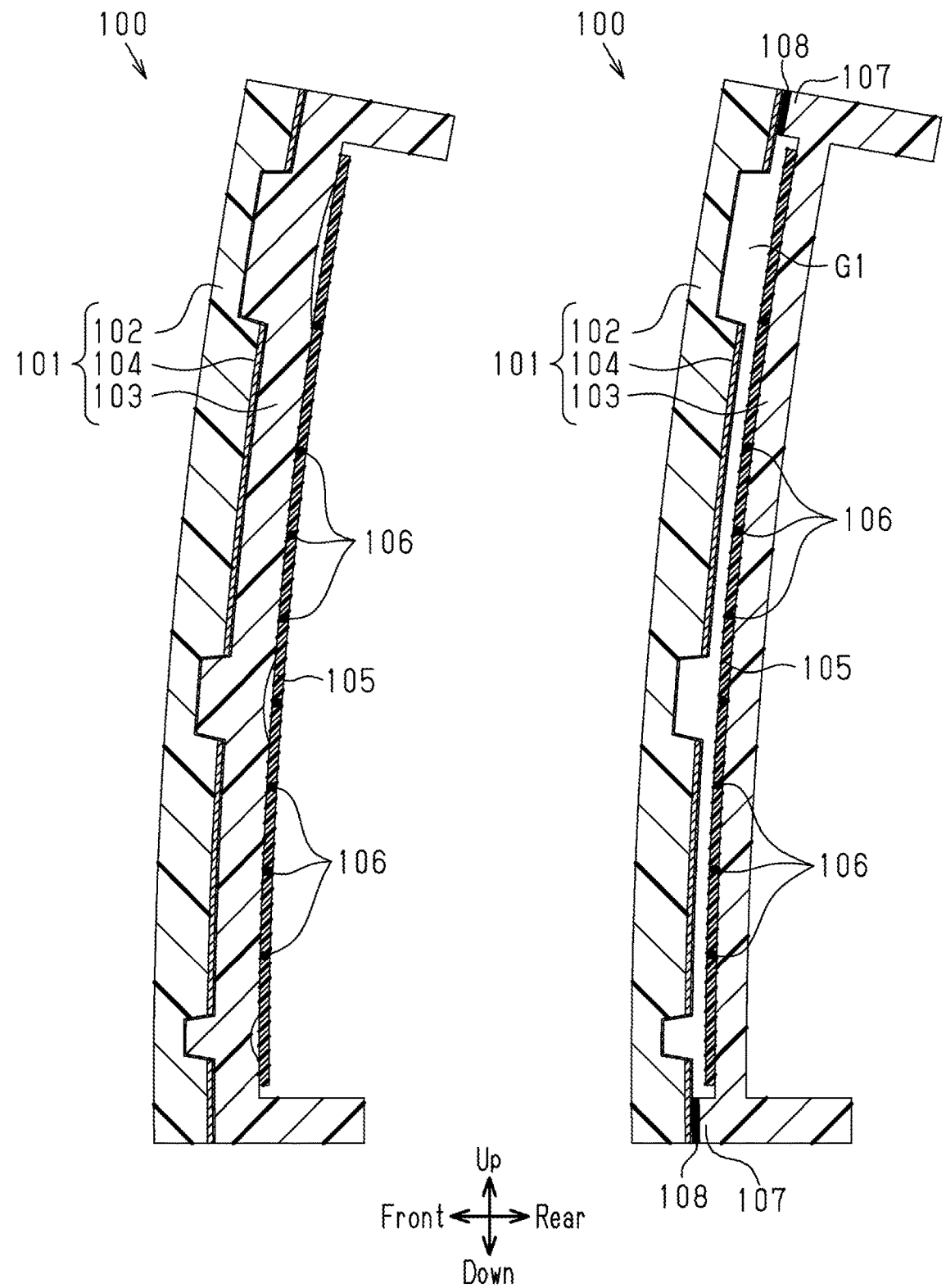

DECORATIVE PART FOR VEHICLE AND METHOD FOR MANUFACTURING SAME

CROSS REFERENCE TO RELATED APPLICATIONS

This application is a U.S. national stage application of International Application No. PCT/JP2017/033315, filed on Sep. 14, 2017, which claims priority to Japanese Patent Application No. 2016-207079 filed on Oct. 21, 2016, and Japanese Patent Application No. 2016-207080 filed on Oct. 21, 2016, the contents of which are incorporated herein by reference.

BACKGROUND

The present invention relates to a vehicle decorative part that decorates a vehicle and has a transparency for millimeter waves transmitted from a millimeter wave radar, and a method for manufacturing the vehicle decorative part.

Some vehicles are equipped with a millimeter wave radar placed behind a vehicle decorative part, such as a front grille and an emblem, to measure the distance to a vehicle and any obstacle using millimeter waves. Typically, the millimeter wave radar temporarily stops measuring when snow adheres to the vehicle decorative part. As millimeter wave radars gain more widespread use, millimeter wave radars that perform measurement during snowfall are sought.

In this respect, a snow-melting function can be added to a vehicle decorative part. FIG. 11A shows an example of a vehicle decorative part 100 that has a snow-melting function.

The vehicle decorative part 100 includes a decorative main body 101 and a heater 105. The decorative main body 101 is attached to the vehicle at the front side in the transmission direction of the millimeter waves from the millimeter wave radar. The decorative main body 101 decorates the vehicle and has a millimeter wave transparency. The decorative main body 101 includes a transparent member 102, which is made of a plastic, a base 103, which is made of a plastic and located at the rear side in the transmission direction of the transparent member 102, and a decorating layer 104, which is located between the transparent member 102 and the base 103. The heater 105 is sheet-shaped and has a heating element 106, which emits heat when energized. The heater 105 is located at the rear side in the transmission direction of the base 103 and adheres to the rear surface of the base 103.

FIG. 11B shows another example of a vehicle decorative part 100.

In this vehicle decorative part 100, a decorating layer 104 is formed on the rear surface in the transmission direction of a transparent member 102. An annular frame section 107 is formed at the periphery of the front surface in the transmission direction of a base 103. The frame section 107 is bonded to the periphery of the rear surface of the transparent member 102 by an adhesion layer 108, which may be made of a hot melt adhesive. A gap G1 formed between the transparent member 102 and the base 103 and surrounded by the frame section 107 accommodates a sheet-shaped heater 105 including a heating element 106. The heater 105 adheres to the front surface of the base 103.

In both of the vehicle decorative parts 100, the millimeter waves transmitted from the millimeter wave radar pass through the decorative main body 101 and the heater 105, which are at the front side in the transmission direction of millimeter waves. The millimeter waves that have bounced off an object, such as a vehicle or an obstacle in front in the transmission direction, also pass through the decorative main body 101 and the heater 105.

When energized, the heating element 106 of the heater 105 emits heat. When snow adheres to the vehicle decorative part 100, the heating element 106 is energized and emits heat, which melts the snow.

For example, Patent Documents 1 and 2 describe vehicle decorative parts having the snow-melting function.

The vehicle decorative part of Patent Document 1 is mainly formed by a decorative main body. A heating wire, which serves as a heater that emits heat when energized, is formed on the front surface of the decorative main body. The heating wire is arranged so as to include a plurality of straight sections, which are parallel to one another and at regular intervals. In the front surface of the decorative main body, grooves are formed between adjacent straight sections and extend parallel to the straight sections. The heat of the heating wire melts the snow adhering to the front surface of the vehicle decorative part into water. This water runs down along the grooves and is discharged from the vehicle decorative part.

Further, the vehicle decorative part of Patent Document 2 is mainly formed by a decorative main body. The decorative main body includes a metal layer serving as a heater that emits heat when energized. In this vehicle decorative part, the metal layer emits heat when energized, melting the snow adhering to the vehicle decorative part.

PATENT DOCUMENTS

Patent Documents

Patent Document 1: Japanese Laid-Open Patent Publication No. 2004-138572
Patent Document 2: Japanese Laid-Open Patent Publication No. 2002-22821

SUMMARY

In the vehicle decorative part 100 shown in FIG. 11A, the heater 105 is located behind the base 103 in the transmission direction of millimeter waves and exposed. As such, there is a risk of water entering through a gap and coming into contact with the heater 105.

In the vehicle decorative part 100 shown in FIG. 11B, the adhesion layer 108 between the transparent member 102 and the frame section 107 of the base 103 limits entry of water into the gap G1, which is located between the transparent member 102 and the base 103 and surrounded by the frame section 107. However, the relative permittivity of the air in the gap G1 differs significantly from the relative permittivities of the transparent member 102 and the base 103, which are made of plastic. This may reduce the capability of transmitting millimeter waves. The vehicle decorative part 100 shown in FIG. 11A does not have the gap G1 and is thus unlikely to cause this problem.

Although the conventional vehicle decorative parts described in Patent Documents 1 and 2 are capable of melting the snow adhering to the vehicle decorative parts by causing the heaters to emit heat, the millimeter waves may be attenuated when passing through the heaters.

To solve the problems described above, it is an objective of the present invention to provide a vehicle decorative part that reduces attenuation of millimeter waves passing through the heater while providing a snow-melting function, and a method for manufacturing the vehicle decorative part.

Another objective of the present invention is to provide a vehicle decorative part that has an improved capability of transmitting millimeter waves while limiting entry of water, and a method for manufacturing the vehicle decorative part.

To achieve the foregoing objective, a vehicle decorative part is provided that includes a decorative main body and a heater. The decorative main body is configured to be attached to a vehicle at a front side in a transmission direction of millimeter waves from a millimeter wave radar to decorate the vehicle and has a millimeter wave transparency. The heater has a heating element that emits heat when energized. At least one of components that form the heater is incorporated in the heater in a millimeter wave attenuation reducing configuration that reduces attenuation of the millimeter waves passing through the heater.

In this configuration, the millimeter waves transmitted from the millimeter wave radar pass through the decorative main body and the heater of the vehicle decorative part located frontward in the transmission direction of the millimeter waves. The millimeter waves that have bounced off an object, such as a vehicle or an obstacle in front in the transmission direction, also pass through the decorative main body and the heater. The attenuation of the millimeter waves passing through the heater is reduced by the components of the heater that are incorporated in the heater in the millimeter wave attenuation reducing configuration. Accordingly, the amount of attenuation of the millimeter waves passing through the vehicle decorative part is reduced as compared to a structure in which none of the components of the heater is incorporated in the heater in the millimeter wave attenuation reducing configuration.

When energized, the heating element of the heater emits heat. When snow adheres to the vehicle decorative part, the heating element is energized and emits heat, which melts the snow.

In the above-described vehicle decorative part, at least a part of the heating element is preferably located in an irradiation region of the millimeter waves in the heater. As the millimeter wave attenuation reducing configuration, the heating element is preferably incorporated in the heater in a condition where an area proportion of an area of a section of the heating element that occupies the irradiation region to an area of the irradiation region is set such that an attenuation amount of the millimeter waves is less than or equal to a permissible value.

The section of the heating element located within the irradiation region of millimeter waves in the heater inhibits transmission of the millimeter waves. The larger the section of the heating element located within the irradiation region, the greater the attenuation of the millimeter waves becomes. For this reason, with consideration given to the area proportion of the area of the section of the heating element that occupies the irradiation region to the area of the irradiation region, the heating element of this configuration is incorporated in the heater in a condition where the area proportion is set such that the amount of attenuation of millimeter waves is less than or equal to the permissible value. Therefore, even if the section of the heating element located within the irradiation region of millimeter waves in the heater prevents transmission of millimeter waves, the amount of attenuation of the millimeter waves passing through the heater is limited to be less than or equal to the permissible value.

In the above-described vehicle decorative part, as the millimeter wave attenuation reducing configuration, the heating element is preferably incorporated in the heater such that the area proportion is less than or equal to 10% when the permissible value of the attenuation amount of the millimeter waves is 2.5 dB.

In this configuration, since the heating element is incorporated in the heater such that the area proportion is less than or equal to 10%, the amount of attenuation of millimeter waves is limited to be less than or equal to a permissible value of 2.5 dB.

In the above-described vehicle decorative part, the heater preferably includes an electrode and a thermistor. As the millimeter wave attenuation reducing configuration, at least one of the electrode and the thermistor is preferably incorporated in the heater at a position outside the irradiation region of the millimeter waves in the heater.

The electrode and the thermistor in the heater can prevent transmission of millimeter waves. In this respect, at least one of the electrode and the thermistor in this configuration is incorporated in the heater at a position outside the irradiation region of the millimeter waves in the heater. Accordingly, as compared to a structure in which the electrode and the thermistor are arranged within the irradiation region, millimeter waves are less likely to be blocked so that the amount of attenuation of the millimeter waves passing through the heater is reduced.

In the above-described vehicle decorative part, at least one of the electrode and the thermistor is preferably incorporated in the heater at a position higher than the irradiation region.

When snow adheres to the front surface of the vehicle decorative part and then melts into water, the water runs down along the front surface. This also applies to rain, muddy water, or other substances on the front surface of the vehicle decorative part. In the configuration described above, at least one of the electrode and the thermistor is located at a position higher than the irradiation region of millimeter waves and is thus spaced apart from the water running down as described above. This reduces the likelihood of water coming into contact with the electrode and the thermistor, as compared to a structure in which the electrode and the thermistor are located at positions lower than the irradiation region.

Further, when the heating element is heated by energization, the temperature of the heating element tends to be lower in a lower section and higher in an upper section.

The thermistor is a resistor whose resistance value varies with the temperature, and is typically used as a temperature detecting element. Based on the detection value of the thermistor, the energization of the heating element is controlled to adjust the temperature of the heater. This reduces degradation of the decorative main body resulting from the heat of the heating element.

When the thermistor is located at a position higher than the irradiation region of millimeter waves, the thermistor detects the temperature of a section of the heating element that has a higher temperature. This reduces the amount of power applied to the heating element as compared to a structure in which the thermistor is positioned at a position lower than the irradiation region of millimeter waves, thereby effectively reducing degradation of the decorative main body resulting from the heat of the heating element.

In the above-described vehicle decorative part, the heating element preferably includes a plurality of straight sections, which extend parallel to one another, and a folded-back section, which connects ends of adjacent ones of the straight sections to each other. The millimeter waves are preferably transmitted so as to vibrate in a plane of polarization. As the millimeter wave attenuation reducing configuration, the straight sections are preferably incorporated in the heater so as to be inclined relative to the plane of polarization.

If the straight sections of the heating element are parallel to the plane of polarization of millimeter waves, a straight section may be located in the plane of polarization in which millimeter waves vibrate while traveling. In this case, the heater blocks transmission of millimeter waves, resulting in attenuation of the millimeter waves.

In contrast, when the straight sections of the heating element are inclined relative to the plane of polarization, the area of the straight sections located in the plane of polarization is smaller than that of the straight sections that are parallel to the plane of polarization. This reduces the amount of millimeter waves blocked by the straight sections and thus the attenuation amount of the millimeter waves.

In the above-described vehicle decorative part, as the millimeter wave attenuation reducing configuration, the straight sections are preferably incorporated in the heater so as to be perpendicular to the plane of polarization.

When the straight sections of the heating element are perpendicular to the plane of polarization like this configuration, the area of the straight sections located in the plane of polarization is smaller than that in any other case in which the straight sections are inclined relative to the plane of polarization. Consequently, the amount of millimeter waves blocked by the straight sections is minimized, reducing the attenuation amount of millimeter waves to the minimum.

In the above-described vehicle decorative part, as the millimeter wave attenuation reducing configuration, the folded-back section is preferably incorporated in the heater at a position outside the irradiation region of the millimeter waves in the heater.

The folded-back sections connect adjacent straight sections extending parallel to each other, and have sections inclined relative to the straight sections.

As such, even when the straight sections of the heating element are inclined relative to the plane of polarization as described above, the folded-back sections can be located in the plane of polarization. In this case, some of the millimeter waves passing through the heater are blocked and attenuated, even though the degree of attenuation is less than that in a structure in which the straight sections are parallel to the plane of polarization.

In this respect, when the folded-back sections are located at positions outside the irradiation region of millimeter waves in the heater like the configuration described above, the millimeter waves are less likely to be blocked and thus the amount of attenuation of the millimeter waves passing through the heater is reduced, as compared to a structure in which the folded-back sections are located within the irradiation region.

In the above-described vehicle decorative part, the decorative main body is preferably configured to be attached to the attachment section of the vehicle in an upright position. The attachment section preferably includes a lower attachment section located below the decorative main body. The decorative main body is preferably configured to be attached to the attachment section such that a front edge in the transmission direction is aligned with a front edge of the lower attachment section or located frontward of the front edge of the lower attachment section.

If the front edge in the transmission direction of the decorative main body is located rearward of the front edge of the lower attachment section, a part of the lower attachment section protrudes frontward beyond the decorative main body. As a result, when some of the snow on the front surface of the vehicle decorative part is melted by the heat of the heater, the unmelted portion of the snow can accumulate on the protruding section of the lower attachment section.

When the front edge of the decorative main body is aligned with the front edge of the lower attachment section or located frontward of the front edge of the lower attachment section like the configuration described above, the lower attachment section does not protrude frontward beyond the decorative main body. As a result, when the heat of the heater melts some of the snow adhering to the front surface of the vehicle decorative part, the unmelted snow does not accumulate on the lower attachment section and falls down.

In the above-described vehicle decorative part, the decorative main body is preferably configured to be attached to an attachment section of the vehicle in an upright position. The attachment section preferably includes a lower attachment section located below the decorative main body. The lower attachment section preferably has an inclined surface, which slopes down toward a front side in the transmission direction. The decorative main body is preferably configured to be attached to the attachment section such that a front edge in the transmission direction of the decorative main body is located above the inclined surface of the lower attachment section.

If the front edge in the transmission direction of the decorative main body is located rearward of the front edge of the lower attachment section, a part of the lower attachment section protrudes frontward beyond the decorative main body. If the upper surface of the lower attachment section extends horizontally, when some of the snow on the front surface of the vehicle decorative part is melted by the heat of the heater, the unmelted portion of the snow can accumulate on the protruding section of the lower attachment section.

In this respect, in the configuration described above, the lower attachment section has an inclined surface, which slopes down toward the front side in the transmission direction, and the front edge in the transmission direction of the decorative main body is located above the inclined surface. Thus, when the heat of the heater melts some of the snow adhering to the front surface of the vehicle decorative part, the unmelted snow runs down along the inclined surface and is unlikely to accumulate on the lower attachment section.

To achieve the foregoing objective, another vehicle decorative part is provided that includes a decorative main body and a sheet-shaped heater. The decorative main body is configured to be attached to a vehicle at a front side in a transmission direction of millimeter waves from a millimeter wave radar to decorate the vehicle and has a millimeter wave transparency. The sheet-shaped heater has a heating element that emits heat when energized. The decorative main body includes a transparent member, which is made of a plastic, a base, which is made of a plastic and located at a rear side in the transmission direction of the transparent member, and a decorating layer, which is located between the transparent member and the base. The base is divided into a front base and a rear base, which is located at a rear side in the transmission direction of the front base. The heater includes a main portion that includes the heating element and is sandwiched by the front base and the rear base from a front side and a rear side in the transmission direction. The front base and the rear base are joined to each other so as to seal the main portion of the heater. A gap adjoining the main portion in the base is filled with the same plastic as the base.

In this configuration, the millimeter waves transmitted from the millimeter wave radar pass through the decorative main body and the heater of the vehicle decorative part located frontward in the transmission direction of the millimeter waves. The millimeter waves that have bounced off an object, such as a vehicle or an obstacle in front in the transmission direction, also pass through the decorative main body and the heater.

The main portion including the heating element of the heater is sandwiched by the front base and the rear base of the base from the front and rear sides in the transmission direction. In addition, since the gaps in the base, which adjoin the main portion, are filled with the same plastic as the base. The base thus does not have gaps within. This limits decrease in the capability of transmitting millimeter waves, which would otherwise result from the air in gaps.

The front and rear bases, which sandwich the main portion of the heater from the front and rear sides in the transmission direction, are joined to each other so as to seal the heating element, leaving no gaps between the front and rear bases. This helps to block water from entering between the front and rear bases and coming into contact with the main portion of the heater.

When energized, the heating element of the heater emits heat. Thus, when snow adheres to the vehicle decorative part, the heating element is energized to emit heat, which melts the snow.

In the above-described vehicle decorative part, the gap adjoining the main portion in the base is preferably filled with a part of the base or with a component that is separate from the base.

In this configuration, since the gaps in the base, which adjoin the main portion, are filled with parts of the base or with components that are formed separately from the base using the same plastic as the base. The base thus does not have gaps within.

In the above-described vehicle decorative part, the front base preferably includes a general section and a protrusion, which protrudes frontward in the transmission direction relative to the general section. The gap adjoining the main portion in the base preferably includes a gap between the main portion and a depression formed in a rear surface in the transmission direction of the front base at a position behind the protrusion.

When the front base, which includes the general section and the protrusion protruding frontward in the transmission direction of millimeter waves relative to the general section, is formed using a plastic, the section including the protrusion undergoes a greater reduction in volume while the molten material cools, as compared to the section including the general section. Thus, a depression may be formed by a sink mark in the rear surface in the transmission direction of the front base at a position behind the protrusion, and a gap may be created between the depression and the main portion of the heater. However, this gap is filled with a part of the base or with a component that is formed separately from the base using the same plastic as the base.

In the above-described vehicle decorative part, the heater preferably includes a through section that extends through the heater in the transmission direction at a position separated at least from the heating element. The rear base preferably includes a joining section that protrudes frontward in the transmission direction to fill the through section, and the joining section is preferably joined directly or indirectly to the front base.

In this configuration, the section of the front base in front of the main portion of the heater is spaced apart from the section of the rear base behind the main portion. However, the joining section, which protrudes frontward in the transmission direction from the rear base to fill the through section, is joined directly or indirectly to the front base. Accordingly, the rear base is joined to the front base more firmly than in a structure that lacks the joining section.

To achieve the foregoing objective, a method for manufacturing a vehicle decorative part is provided. The vehicle decorative part includes a decorative main body and a sheet-shaped heater. The decorative main body is configured to be attached to a vehicle at a front side in a transmission direction of millimeter waves from a millimeter wave radar to decorate the vehicle and has a millimeter wave transparency. The sheet-shaped heater has a heating element that emits heat when energized. The decorative main body includes a transparent member, which is made of a plastic, a base, which is made of a plastic and located at a rear side in the transmission direction of the transparent member, and a decorating layer, which is located between the transparent member and the base. The base is divided into a front base and a rear base, which is located at a rear side in the transmission direction of the front base. The method includes, after the transparent member, the decorating layer, and the front base are formed sequentially, forming the rear base by insert molding using, as an insert, an intermediate molded part in which a main portion of the heater including the heating element is located at a rear side in the transmission direction of the front base.

In this manufacturing method, after the transparent member, the decorating layer, and the front base are formed sequentially, the rear base is formed by insert molding using, as an insert, an intermediate molded part in which the main portion of the heater is located on the rear side in the transmission direction of the front base. That is, the insert is placed in a mold, and a molten plastic is injected into the mold and cured. As a result, the rear base is formed on the rear side in the transmission direction of the main portion of the heater. The rear base is joined to the front base so as to seal the main portion.

In the above-described method for manufacturing a vehicle decorative part, the insert molding is preferably performed in a state where the heater includes a through section that extends through the heater in the transmission direction at a position separated at least from the heating element.

In this manufacturing method, when the molten plastic injected into the mold during the insert molding is cured, the rear base is formed on the rear side in the transmission direction of the main portion of the heater so as to be joined to the front base. In addition, the molten plastic is introduced into the through section of the heater and cured, forming a joining section, which protrudes frontward in the transmission direction and fills the through section. This joining section is joined directly or indirectly to the front base, so that the rear base is joined to the front base more firmly than in a structure that lacks the joining section.

In the above-described method for manufacturing a vehicle decorative part, the front base preferably includes a general section and a protrusion that protrudes frontward in the transmission direction relative to the general section, and the insert molding is preferably performed such that the through section of the heater communicates with a depression formed in a rear surface in the transmission direction of the front base at a position behind the protrusion.

When the front base, which includes the general section and the protrusion protruding frontward in the transmission direction of millimeter waves relative to the general section, is formed of a plastic, the section including the protrusion undergoes a greater reduction in volume while the molten material cools, as compared to the section including the general section. Thus, a depression may be formed by a sink mark in the rear surface in the transmission direction of the front base at a position behind the protrusion. A gap is created between the depression of the front base and the main portion of the heater. However, this gap is filled with the molten plastic that has passed through the through section during the insert molding of the rear base.

The vehicle decorative part and the method for manufacturing the same described above reduce attenuation of millimeter waves passing through the heater, while providing a snow-melting function. In addition, the vehicle decorative part and the method for manufacturing the same described above improve the capability of transmitting millimeter waves while limiting entry of water.

BRIEF DESCRIPTION OF THE DRAWINGS

FIGS. 6A to 6E are partial cross-sectional views illustrating states during manufacturing of an emblem of the embodiment.

FIGS. 7A and 7B are partial cross-sectional views illustrating states during manufacturing of an emblem of the embodiment.

FIGS. 11A and 11B are cross-sectional views showing conventional vehicle decorative parts.

DETAILED DESCRIPTION OF THE PREFERRED EMBODIMENTS

Referring to FIGS. 1 to 7B, an emblem that is an embodiment of a vehicle decorative part is now described. The drawings are not necessarily to scale in order for the components to be recognizable.

Figure 3:
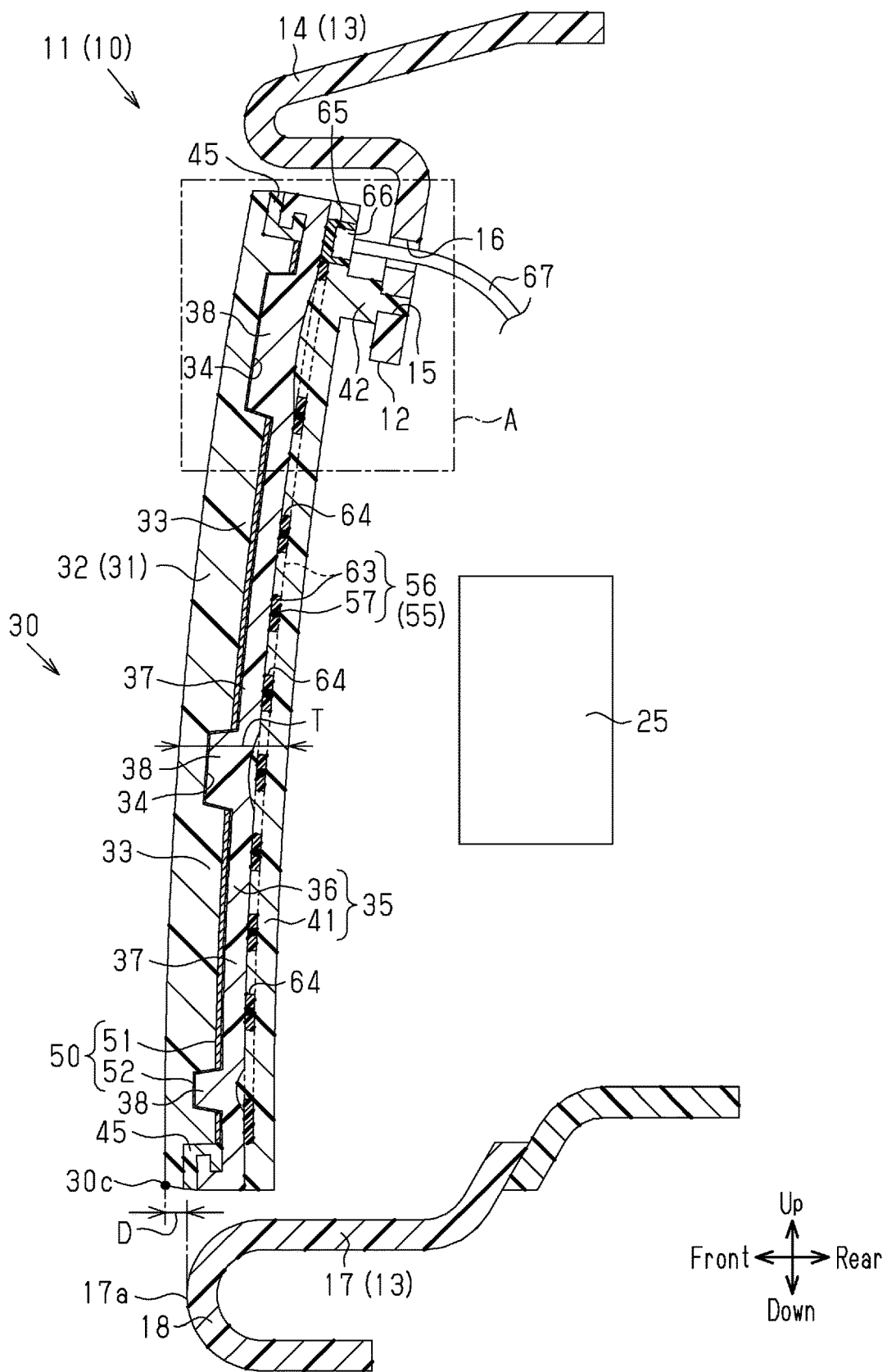
FIG. 3 is a cross-sectional view showing the emblem of the embodiment attached to the front grille, together with a millimeter wave radar.
Figure 4:
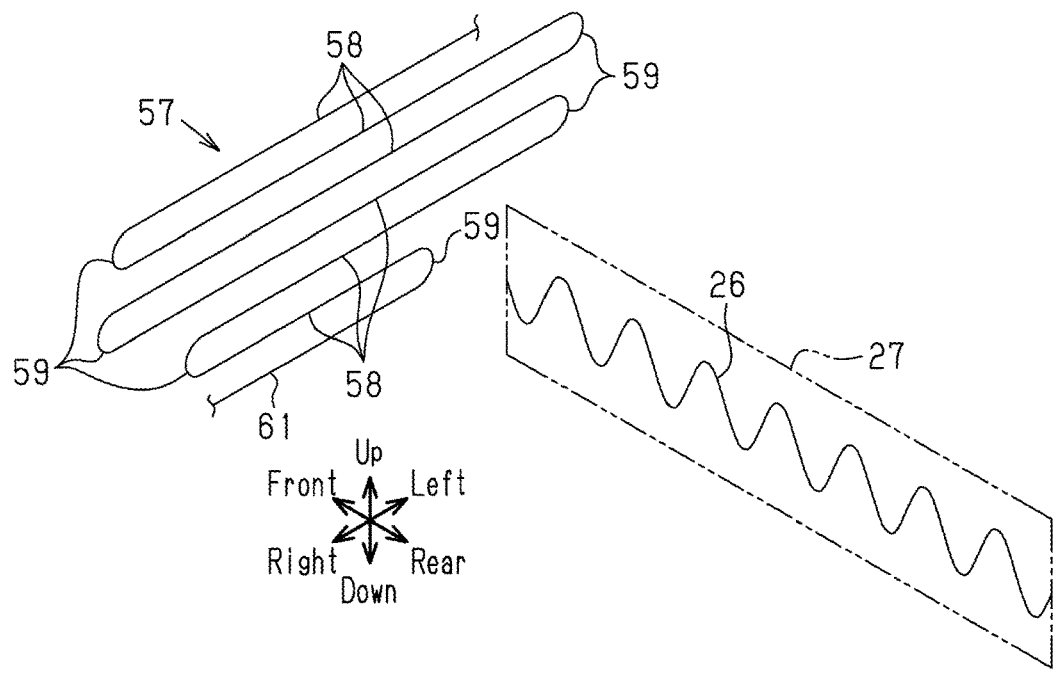
FIG. 4 is a perspective view illustrating the relationship between the heating element and the plane of polarization of millimeter waves in the embodiment.

As shown in FIGS. 3 and 4, a front grille 11 is located at the front of the engine compartment of a vehicle 10. The front grille 11 introduces the ambient air, such as relative wind, into the engine compartment to cool the radiator.

A millimeter wave radar 25, which functions as a sensor for adaptive cruise control (ACC), is located rearward of the front grille 11 and frontward of the radiator. The millimeter wave radar 25 transmits millimeter waves 26 and also receives the millimeter waves 26 that have bounced off an object. The millimeter waves 26 are transmitted from the millimeter wave radar 25 so as to vibrate in a plane of polarization 27, which is a plane parallel to a vertical plane. The millimeter wave radar 25 measures the distance and the relative speed between the host vehicle (the vehicle 10) and the vehicle in front based on the difference between the transmitted millimeter waves 26 (transmitting waves) and the received millimeter waves 26 (receiving waves). Millimeter waves 26 are radio waves having a wavelength of between 1 to 10 mm and a frequency of between 30 to 300 GHz. Based on the result of measurement with the millimeter wave radar 25, the ACC system controls the engine throttle and the brakes to accelerate and decelerate the host vehicle (the vehicle 10) so as to control the distance between the vehicles.

As is the case with a typical front grille, the thickness of the front grille 11 may vary. Additionally, as is the case with a typical front grille, the front grille 11 may have a metal plating layer formed on the surface of the plastic base. The front grille 11 thus interferes with the transmitted or reflected millimeter waves 26. For this reason, the front grille 11 includes a window 12, which is located in a position in the path of the millimeter waves 26 transmitted from the millimeter wave radar 25, specifically, a position frontward of the millimeter wave radar 25 in the transmission direction of millimeter waves 26 from the millimeter wave radar 25.

Figure 1:
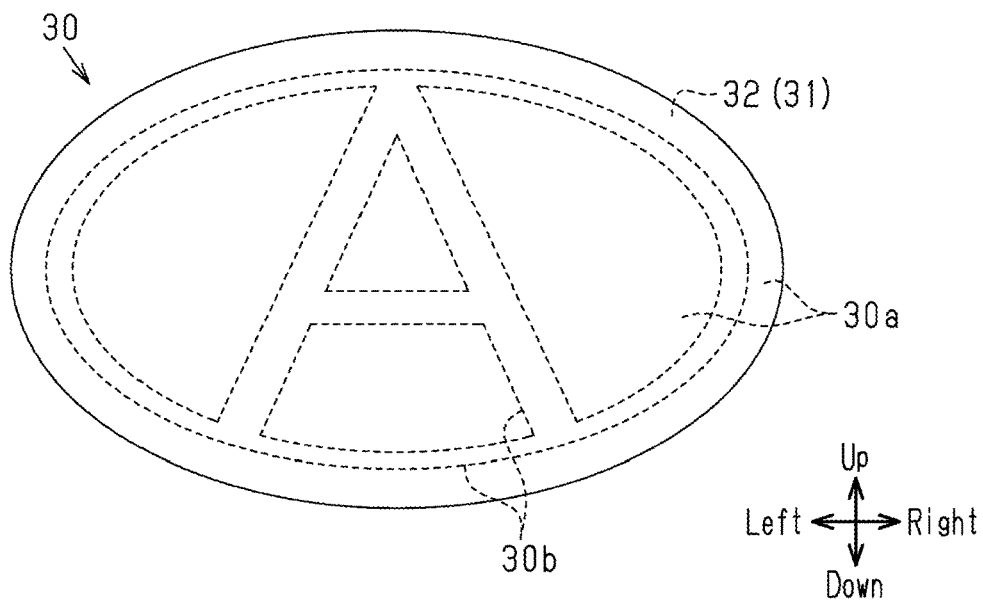
FIG. 1 is a front view showing an emblem that is an embodiment of a vehicle decorative part.

As shown in FIGS. 1 and 3, the emblem 30 includes a decorative main body 31 and a heater 55. The decorative main body 31 is attached to the vehicle 10 at the front side in the transmission direction of the millimeter waves from the millimeter wave radar 25 to decorate the vehicle 10. The decorative main body 31 also has a millimeter wave transparency. The heater 55 has a heating element 57 that emits heat when energized.

The decorative main body 31 includes a transparent member 32, a base 35, a coupling section 45, and a decorating layer 50. The decorative main body 31 is substantially planar and elliptical as a whole. The decorative main body 31 gently curves and protrudes frontward.

The transparent member 32 forms the front section of the emblem 30. The transparent member 32 is transparent and made of a plastic such as a polycarbonate (PC) plastic, which is a plastic having a small dissipation factor (the index value indicating the degree of electric energy loss in a dielectric). The dissipation factor of a PC plastic is 0.006. A smaller dissipation factor results in fewer millimeter waves 26 converted into thermal energy, thereby reducing attenuation of millimeter waves 26.

Figure 5:
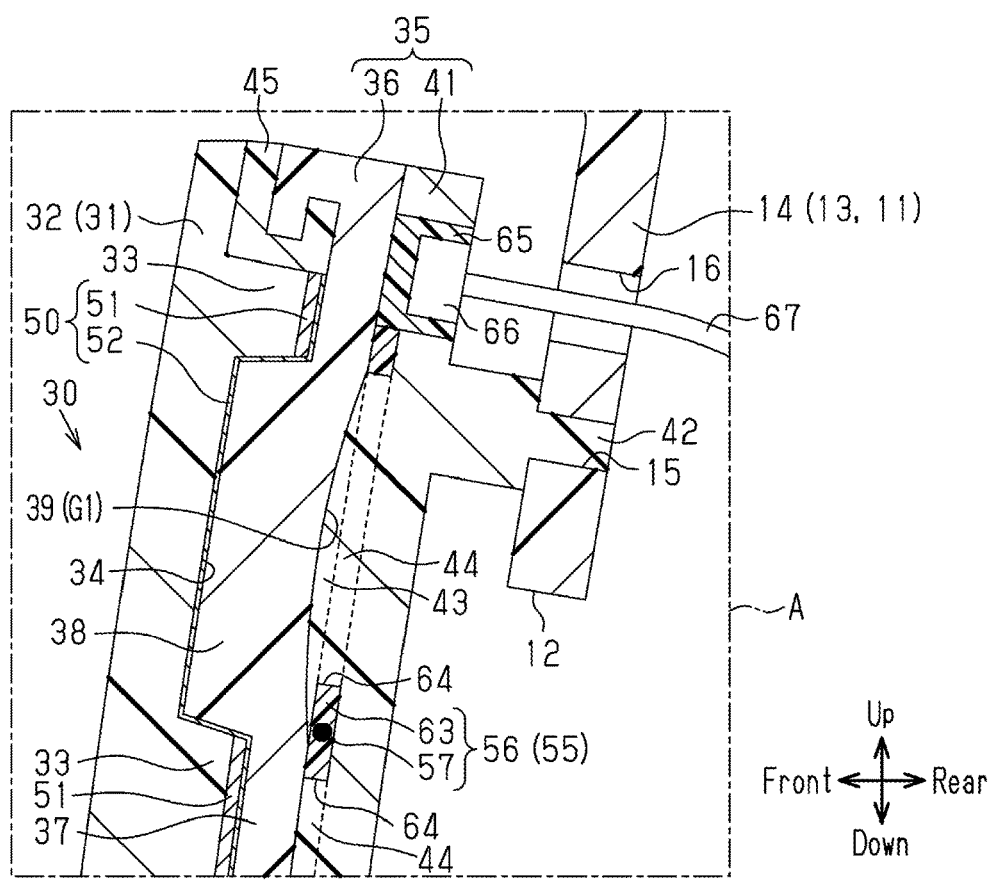
FIG. 5 is an enlarged cross-sectional view of section A in FIG. 3.

FIG. 5 is an enlarged view of section A in FIG. 3. As shown in FIG. 5, the rear side of the transparent member 32 includes general sections 33, which extend substantially perpendicular to the front-rear direction, and a recess 34, which extends frontward relative to the general sections 33. The general sections 33 correspond to the background region 30a of the emblem 30 shown in FIG. 1, and the recess 34 corresponds to the pattern region 30b of the emblem 30. In this embodiment, the character A and the annular section surrounding it form the pattern region 30b. The transparent member 32 may be made of a polymethyl methacrylate (PMMA) plastic, which is a plastic having a small dissipation factor like a PC plastic.

A hard coat layer (not shown) is formed on the front surface of the transparent member 32 by applying a known finishing agent for plastic. Examples of the finishing agent include organic hard coating agents, which may be acrylate-based, oxetane-based, or silicone-based, inorganic hard coating agents, and organic-inorganic hybrid hard coating agents. The hard coat layer made of these hard coating agents has useful effects on the front surface of the transparent member 32, such as scratch prevention, stain prevention, improved light and weather resistance resulting from UV protection, and improved water repellency. The hard coat layer may be colored if necessary as long as the layer allows transmission of millimeter waves 26.

As shown in FIGS. 3 and 5, the base 35 is a component forming the rear section of the emblem 30. The base 35 is colored and made of a plastic such as an acrylonitrile-ethylene-styrene copolymer (AES) plastic, which has a small dissipation factor. An AES plastic has a dissipation factor of 0.007 and substantially the same relative permittivity as a PC plastic. The base 35 is divided into a front base 36, which forms the front side, and a rear base 41, which forms the rear side. The front side of the front base 36 is shaped to conform to the shape of the rear side of the transparent member 32. That is, the front side of the front base 36 includes general sections 37 located behind the general sections 33 of the transparent member 32. The general sections 37 extend substantially perpendicular to the front-rear direction. The front side of the front base 36 also includes a protrusion 38 located behind the recess 34 of the transparent member 32. The protrusion 38 extends frontward relative to the general sections 37.

The front base 36, which includes the general sections 37 and the protrusion 38, is thicker in the section including the protrusion 38 than in the section including the general sections 37. As a result, when the front base 36 is molded from a plastic, the section including the protrusion 38 undergoes a greater reduction in volume while the molten material cools, as compared to the section including the general sections 37. Thus, depressions 39 may be formed by sink marks in the rear surface of the front base 36 at positions behind the protrusion 38. In this case, a gap G1 is created between each depression 39 of the front base 36 and a main portion 56 of a heater 55, which is described below.

Figure 2:
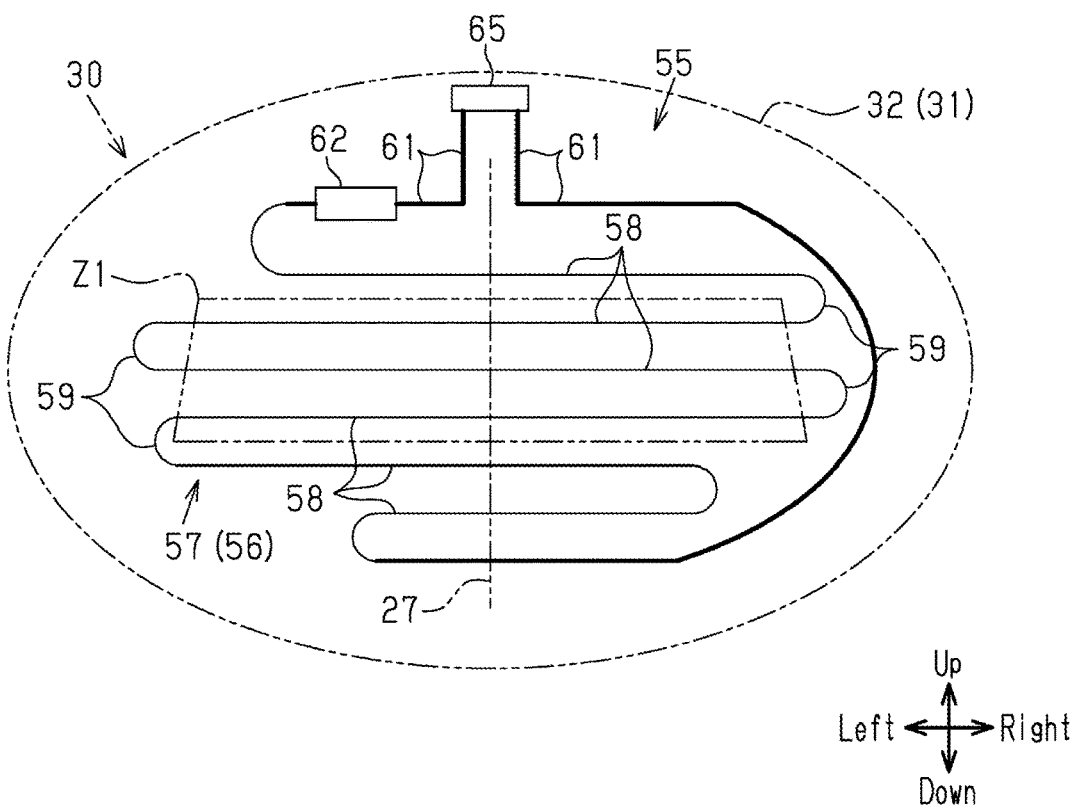
FIG. 2 is a schematic front view showing the heater of the emblem in FIG. 1, together with the irradiation region and the plane of polarization of millimeter waves.

The rear surface of the rear base 41 includes attaching sections 42 at positions outside the irradiation region Z1 of millimeter waves (FIG. 2). The attaching sections 42 project rearward to attach the decorative main body 31 to the front grille 11.

Instead of an AES plastic, the base 35 (the front base 36 and the rear base 41) may be made of a plastic having a relative permittivity similar to that of the transparent member 32, such as an acrylonitrile-styrene-acrylate copolymer (ASA) plastic, a PC plastic, or a PC/acrylonitrile-butadiene-styrene copolymerization (ABS) plastic.

A coupling section 45 extends along the periphery of the emblem 30 and thus has the shape of an elliptical ring. The coupling section 45 is located outside the irradiation region Z1 (FIG. 2). The coupling section 45 is black and made of a mixed plastic of a PC plastic and carbon black. The coupling section 45 is fused to the transparent member 32 and the front base 36 so as to couple the transparent member 32 to the front base 36.

The decorating layer 50, which decorates the front side of the vehicle 10 including the front grille 11, is located in a region between the transparent member 32 and the front base 36 and surrounded by the coupling section 45. The decorating layer 50 has a millimeter wave transparency. The decorating layer 50 may be formed by a combination of a colored layer 51, such as a black layer, and a metal layer 52. The colored layer 51 is formed on the general sections 33 of the transparent member 32 by printing or other method. The metal layer 52 is formed by vapor depositing a metal material, such as indium, on the wall surface defining the recess 34 of the transparent member 32 and the entire rear surface of the colored layer 51.

As shown in FIGS. 2 and 5, the heater 55 includes a planar heating element or a film heater, for example. The heater 55 includes a wire heating element 57, electrodes 61, a thermistor 62, a plastic sheet 63, and a connector 65 as components. The plastic sheet 63 sandwiches and covers the heating element 57, the electrodes 61, and the thermistor 62 from the front and rear sides. The heating element 57, the electrodes 61, the thermistor 62, and the plastic sheet 63 form the main portion 56 of the heater 55.

The plastic sheet 63 may be made of a polyimide plastic. The wire heating element 57 may be a nichrome wire, an etched stainless steel heater, a carbon heating element, a silver paste, or a transparent conductive film, for example.

As shown in FIGS. 2 and 4, the heating element 57 includes straight sections 58, which extend parallel to one another, and folded-back sections 59, which connect ends of adjacent straight sections 58 to each other. The folded-back sections are each arcuate. The straight sections 58 are incorporated in the heater 55 in a configuration that reduces the attenuation of the millimeter waves 26 passing through the heater 55 (hereinafter referred to as "millimeter wave attenuation reducing configuration"). In the millimeter wave attenuation reducing configuration, the straight sections 58 extend perpendicular to the plane of polarization 27 of millimeter waves 26. Since the plane of polarization 27 is parallel to the vertical plane, the straight sections 58 extend in the horizontal direction (the lateral direction).

Some of the straight sections 58 are located within the irradiation region Z1 of millimeter waves 26 in the heater 55. As the millimeter wave attenuation reducing configuration, the heating element 57 is incorporated in the heater 55 in a condition where the area proportion of the area of the sections of the straight sections 58 that occupy the irradiation region Z1 to the area of the irradiation region Z1 is set such that the attenuation amount of the millimeter waves 26 is less than or equal to a permissible value. In the present embodiment, the permissible value of the attenuation amount of millimeter waves 26 is 2.5 dB. The arrangement pattern of the heating element 57, such as the width of the straight sections 58 and the spacing (pitch) between adjacent straight sections 58, is set such that the area proportion is less than or equal to 10%.

The electrodes 61 are connected to the opposite ends of the heating element 57. The thermistor 62 is a resistor whose resistance value varies with the temperature, and is used as a temperature detecting element. The thermistor 62 is provided in the middle section of one electrode 61 and connected to an electronic controller (not shown) provided at a position apart from the emblem 30 in the vehicle 10. Based on the values detected by the thermistor 62, the electronic controller adjusts the temperature of the heater 55 by controlling to energize the heating element 57 through the electrodes 61.

The connector 65 has a waterproof structure and is connected to ends of the two electrodes 61. The connector 65 protrudes rearward of the plastic sheet 63.

As the millimeter wave attenuation reducing configuration, the folded-back sections 59, the electrodes 61, and the thermistor 62 of the heating element 57 are incorporated in the heater 55 at positions outside the irradiation region Z1 of millimeter waves 26 in the heater 55. In particular, the electrodes 61 and the thermistor 62 are incorporated in the heater 55 at positions higher than the irradiation region Z1.

Further, as shown in FIGS. 3 and 5, the plastic sheet 63 includes a plurality of non-covering sections, which does not cover the heating element 57, the electrodes 61, or the thermistor 62. At least some of the non-covering sections include through sections 64, which extend in the front-rear direction. The through sections 64 may be formed by punching through the plastic sheet 63. Some of the through sections 64 connect to the depressions 39 in the rear surface of the front base 36 at positions behind the protrusion 38.

In the heater 55, the main portion 56 is located between the front base 36 and the rear base 41, and the connector 65 is exposed on the rear surface of the rear base 41. The front and rear bases 36 and 41, which sandwich the main portion 56 of the heater 55 from the front and rear sides, are fused and thus joined to each other so as to seal the main portion 56. That is, the rear base 41 is fused and joined to the rear surface of the front base 36 around the main portion 56 of the heater 55.

The rear base 41 includes depression-filling sections 43, which are equal in number to the depressions 39, and joining sections 44, which are equal in number to the through sections 64. Each depression-filling section 43 is joined to the wall surface defining the corresponding depression 39 so as to fill the depression 39. Each joining section 44 projects frontward from the front surface of the rear base 41 at a position behind the corresponding through section 64 so as to fill the through section 64.

The joining sections 44 in the through sections 64 that do not connect to a depression 39 in the front base 36 are directly joined to sections of the rear surface of the front base 36 other than the depressions 39. The joining sections 44 in the through sections 64 that connect to the respective depressions 39 in the front base 36 each connect to a depression-filling section 43 and are each joined indirectly to the corresponding depression 39 in the rear surface of the front base 36 through the depression-filling section 43.

When the thickness of the decorative main body 31 and the heater 55 in the front-rear direction of the emblem 30 at least in the irradiation region Z1 is "T", this thickness T is uniformly set to a value substantially equal to the value that satisfies Expression 1 below. Here, "the thickness substantially equal" refers to a thickness that is within a tolerance range of ±0.2 mm.

$$T = \{(\lambda e/2)/\sqrt{(\varepsilon p)}\}n \quad \text{(Expression 1)}$$

where $\lambda e$ represents the wavelength of millimeter waves, $\varepsilon p$ represents the relative permittivity of the transparent member 32 (or the base 35), and n represents an integer.

As such, the thickness T of the emblem 30 is set to an integral multiple of the value obtained by dividing the half wavelength by the square root of the relative permittivity.

As shown in FIG. 3, the section of the front grille 11 around the window 12 includes an attachment section 13 to which the emblem 30 is attached. The attachment section 13 includes an upper attachment section 14 above the window 12 and a lower attachment section 17 below the window 12.

As described above, the attaching sections 42 are formed on the rear surface of the rear base 41, and the upper attachment section 14 includes insertion holes 15 into which the attaching sections 42 are inserted. In addition to the upper attachment section 14, other areas of the attachment section 13 include similar insertion holes 15 around the window 12. The front edge section of the lower attachment section 17 includes a curved section 18 having an arcuate cross section.

Each attaching section 42 is inserted into and fastened to the corresponding insertion hole 15 from the front side, so that the emblem 30 is attached to the attachment section 13 in an upright position that satisfies the following condition. This upright position includes not only a vertical position but also a position inclined relative to the vertical position. In the present embodiment, the upright position is a position that is slightly inclined such that the upper part of the emblem 30 is located slightly rearward of the lower part.

The condition to be satisfied is that the front edge 30c of the emblem 30 (the decorative main body 31) is aligned with the front edge 17a of the lower attachment section 17 or located frontward of the front edge 17a. The front edge 30c of the emblem 30 is the most forward position of the front surface of the emblem 30. The emblem 30 of the present embodiment is slightly inclined such that the upper part is located slightly rearward of the lower part. As such, the front edge 30c is the lower edge of the front surface of the emblem 30. In the present embodiment, the lower attachment section 17 has the curved section 18, and the front edge 17a of the lower attachment section 17 is the front edge of the curved section 18. In the present embodiment, the front edge 30c of the emblem 30 (the decorative main body 31) is located at a frontward position separated by a distance D (D>0) from the front edge 17a of the lower attachment section 17.

The vehicle 10 has a connector 66 that is connected from the rear side to the connector 65 exposed on the rear surface of the rear base 41. This electrically connects the heater 55 to the electronic controller and other devices. The connector 66 is connected to a cable 67, which extends through an insertion hole 16 formed in the upper attachment section 14.

The operation and advantages of the emblem 30 of the present embodiment configured as described above are now described together with the method for manufacturing the emblem 30.

First, referring to FIGS. 6A to 7B, the method for manufacturing the emblem 30 is briefly described. In FIGS. 6A to 7B, the left side as viewed in the drawings corresponds to the front side of the emblem 30, and the right side as viewed in the drawings corresponds to the rear side of the emblem 30.

First, referring to FIG. 6A, a transparent member 32, which has general sections 33 and a recess 34 in the rear side, is formed by injection molding.

As shown in FIG. 6B, a colored layer 51 is formed on the general sections 33 of the transparent member 32 by printing, such as screen printing, using black paint, for example.

As shown in FIG. 6C, a metal material, such as indium, is vapor deposited on the wall surfaces defining the recess 34 of the transparent member 32 and the colored layer 51, thereby forming a metal layer 52. This forms a decorating layer 50, including the colored layer 51 and the metal layer 52, on the rear surface of the transparent member 32.

As shown in FIG. 6D, a front base 36 is formed by insert molding. That is, the intermediate molded part 71 (FIG. 6C), which is formed by forming the decorating layer 50 on the rear surface of the transparent member 32, is placed in a mold as an insert. A molten plastic including an AES plastic is injected into the mold and cured. This forms an intermediate molded part 72, in which the front base 36 having the general sections 37 and the protrusion 38 is integrally joined to the rear side of the transparent member 32 and the decorating layer 50.

When the front base 36 is thus molded, the section including the protrusion 38 undergoes a greater reduction in volume while the molten material cools, as compared to the section including the general sections 37. Thus, depressions 39 may be formed by sink marks in the rear surface of the front base 36 at positions behind the protrusion 38.

As shown in FIG. 6E, a coupling section 45 is formed by two-color molding using a mixed plastic of a PC plastic and carbon black. Two-color molding is a molding method of plastics that combines different materials and molds them into an integral part. In the two-color molding, after forming the primary portion (the intermediate molded part 72 shown in FIG. 6D), the secondary portion (the coupling section 45) is formed integrally with the primary portion (the intermediate molded part 72) in the same mold. During this two-color molding, the mixed plastic in a molten state comes into contact with the transparent member 32 and the front base 36, causing parts of the transparent member 32 and the front base 36 to melt and be mixed with the molten mixed plastic. Accordingly, the boundary sections between the coupling section 45 and the transparent member 32 are fused to each other, and the boundary sections between the coupling section 45 and the front base 36 are fused to each other. The coupling section 45 couples the transparent member 32 to the front base 36, forming an intermediate molded part 73.

As shown in FIG. 7A, the main portion 56 of a heater 55 is placed behind the front base 36 of the intermediate molded part 73 (FIG. 6E). The main portion 56 is placed such that some of its through sections 64 communicate with the depressions 39, which are formed in the rear surface of the front base 36 at positions behind the protrusion 38. The main portion 56 thus placed is bonded to the rear surface of the front base 36. In this state, a gap G1 is created between each depression 39 of the front base 36 and the main portion 56.

As shown in FIG. 7B, a rear base 41 is formed by insert molding. That is, the intermediate molded part 74 (FIG. 7A), which is formed when the main portion 56 is bonded to the front base 36, is placed in a mold as an insert. The molten plastic including an AES plastic that is the same as the material of the front base 36 is injected into the mold. When this plastic is cured, the rear base 41 is formed behind the front base 36 and the main portion 56. The rear base 41 is joined to the front base 36 so as to seal the main portion 56. The rear base 41 also includes attaching sections 42.

The section of the front base 36 in front of the main portion 56 is separated from the section of the rear base 41 behind the main portion 56. However, the molten plastic is introduced into and cured in the through sections 64, thereby forming the joining sections 44, which protrude frontward from the rear base 41 and fill the through sections 64.

The joining sections 44 in the through sections 64 that do not connect to a depression 39 in the front base 36 are directly joined to sections of the rear surface of the front base 36 other than the depressions 39.

The gaps G1 between the main portion 56 and the depressions 39, which are formed by sink marks in the rear surface of the front base 36 at positions behind the protrusion 38, connect to some of the through sections 64. As such, the gaps G1 are filled with the molten plastic that has passed through the connecting through sections 64, that is, the gaps G1 are filled with the depression-filling sections 43, which are parts of the rear base 41. In other words, the joining sections 44 that fill the through sections 64 connecting to the depressions 39 of the front base 36 are indirectly joined to the depressions 39 in the rear surface of the front base 36 through the depression-filling sections 43.

Accordingly, the rear base 41 is joined to the front base 36 more firmly than a structure that lacks the joining sections 44.

Then, a hard coat layer (not shown) is formed on the front surface of the transparent member 32 by applying a finishing agent. Further, a connector 65 is attached from the rear side of the rear base 41 so as to be connected to the electrodes 61 of the heater 55, so that the intended emblem 30 is obtained.

In the emblem 30, the decorating layer 50 between the base 35 and the transparent member 32 has the function of decorating the front side of the vehicle 10. When the emblem 30 is viewed from the front, light is reflected by the decorating layer 50, which has an uneven shape. Accordingly, the pattern including a character with metallic luster, which is located behind the hard coat layer and the transparent member 32, is viewed three-dimensionally through these layers.

The decorating layer 50, the front base 36, and the coupling section 45 are located in front of the heater 55, thereby hiding the heater 55. Thus, the heater 55 is less visible from the front side of the emblem 30 and is unlikely to compromise the appearance of the emblem 30.

When the millimeter wave radar 25 transmits millimeter waves 26 frontward to measure the distance and the relative speed between the vehicle in front and the host vehicle (the vehicle 10), the millimeter waves 26 pass through the rear base 41, the heater 55, the front base 36, the decorating layer 50, the transparent member 32, and the hard coat layer of the emblem 30. The millimeter waves 26 that have bounced off an object, such as a vehicle or an obstacle in front in the transmission direction, also pass through the decorative main body 31 and the heater 55.

Of the components forming the heater 55, the components incorporated in the heater 55 in the millimeter wave attenuation reducing configuration as described below reduce the attenuation of the millimeter waves 26 passing through the heater 55.

(1) As shown in FIG. 2, the section of the heating element 57 located in the irradiation region Z1 of millimeter waves 26 in the heater 55 inhibits transmission of the millimeter waves 26. The larger the section of the heating element 57 located within the irradiation region Z1, the greater the attenuation of the millimeter waves 26 becomes. For this reason, with consideration given to the area proportion of the area of the section of the heating element 57 that occupies the irradiation region Z1 to the area of the irradiation region Z1, the heating element 57 of the present embodiment is incorporated in the heater 55 in a condition where the area proportion is set such that the amount of attenuation of millimeter waves 26 is less than or equal to the permissible value. Specifically, the permissible value is set to 2.5 dB, and the arrangement pattern (e.g., width and pitch) of the heating element 57 is set such that the area proportion is less than or equal to 10%.

Consequently, even if the section of the heating element 57 located within the irradiation region Z1 prevents the transmission of millimeter waves 26, the amount of attenuation of the millimeter waves 26 passing through the heater 55 is limited to be less than or equal to a permissible value of 2.5 dB.

(2) The electrodes 61 and the thermistor 62 of the heater 55 can prevent transmission of millimeter waves 26. For this reason, as shown in FIG. 2, the electrodes 61 and the thermistor 62 of the present embodiment are incorporated in the heater 55 at positions outside the irradiation region Z1 of millimeter waves 26 in the heater 55. Accordingly, as compared to a structure in which the electrodes 61 and the thermistor 62 are located within the irradiation region Z1, the millimeter waves 26 are less likely to be blocked, so that the amount of attenuation of the millimeter waves 26 passing through the heater 55 is reduced.

(3) If the straight sections 58 of the heating element 57 are parallel to the plane of polarization 27 of millimeter waves 26, a straight section 58 may be located in the plane of polarization 27, in which millimeter waves vibrate while traveling. In this case, the heater 55 blocks and attenuates millimeter waves 26.

In contrast, as shown in FIGS. 2 and 4, when the straight sections 58 are inclined relative to the plane of polarization 27, the area of the straight sections 58 located in the plane of polarization 27 is smaller than that of the straight sections 58 that are parallel to the plane of polarization 27. This reduces the amount of millimeter waves 26 blocked by the straight sections 58 and thus the attenuation amount of the millimeter waves 26.

In particular, in the present embodiment, the straight sections 58 are incorporated in the heater 55 so as to be perpendicular to the plane of polarization 27. This results in the area of the straight sections 58 located in the plane of polarization 27 being smaller than that in any other case in which the straight sections 58 are inclined relative to the plane of polarization 27. Consequently, the amount of millimeter waves 26 blocked by the straight sections 58 is minimized, reducing the attenuation amount of the millimeter waves 26 to the minimum.

(4) The folded-back sections 59 of the heating element 57, which connect adjacent straight sections 58 extending parallel to each other, have sections inclined relative to the straight sections 58.

As such, even when the straight sections 58 are inclined (perpendicular) relative to the plane of polarization 27 as described above, the folded-back sections 59 can be located in the plane of polarization 27. In this case, some of the millimeter waves 26 passing through the heater 55 are blocked and attenuated, even though the degree of attenuation is less than that in a structure in which the straight sections 58 are parallel to the plane of polarization 27.

As shown in FIG. 2, when the folded-back sections 59 are located at positions outside the irradiation region Z1 of millimeter waves 26 in the heater 55, the millimeter waves 26 are less likely to be blocked, and the amount of attenuation of the millimeter waves 26 passing through the heater 55 is reduced as compared to a structure in which the folded-back sections 59 are located in the irradiation region Z1.

Accordingly, the amount of attenuation of the millimeter waves 26 passing through the heater 55 is reduced as compared to a structure in which none of the components of the heater 55 is incorporated in the heater 55 in the millimeter wave attenuation reducing configuration.

The front and rear bases 36 and 41 of the base 35 sandwich the main portion 56 of the heater 55, which includes the heating element 57, from the front and rear sides. In addition, since the gaps G1 in the base 35, which adjoin the main portion 56, are filled with parts of the rear base 41, that is, with the same plastic as the base 35. The base 35 thus does not have gaps within. The present embodiment limits decrease in the capability of transmitting millimeter waves, which would otherwise occur if the gaps G1 are not filled and the air in the gaps G1 lowers the capability of transmitting millimeter waves.

Further, in at least the irradiation region Z1 (FIG. 2), the decorative main body 31 and the heater 55 have a thickness T in the front-rear direction of the emblem 30 that is uniform and satisfies Expression 1 described above. This reduces the amount of attenuation of the passing millimeter waves 26 as compared to a structure in which the thickness T is not uniform.

The reduced amount of attenuation of the millimeter waves 26 passing through the emblem 30 ensures that the millimeter wave radar 25 fully performs its functions including the measurement of the distance to a vehicle or an obstacle using millimeter waves 26.

When snow adheres to the front surface of the emblem 30, the electronic controller (not shown) controls to energize the heating element 57 through the electrodes 61 based on the detection values of the thermistor 62. The energized heating element 57 generates heat, part of which is transmitted to the front surface of the emblem 30 and melts the snow adhering to the front surface.

The energization control performed by the electronic controller adjusts the temperature of the heater 55, preventing an excessive increase in the temperature of the heater 55. This reduces degradation of the decorative main body 31 resulting from the heat of the heating element 57.

The present embodiment has the following additional effects and advantages.

In the present embodiment, the front and rear bases 36 and 41, which sandwich the main portion 56 of the heater 55 from the front and rear sides, are mechanically joined to each other through fusion. This reduces degradation over time in the joint section, as compared to a structure in which the front and rear bases 36 and 41 are joined chemically using an adhesive. The front and rear bases 36 and 41 therefore remain joined for a long duration of time.

The plastic sheet 63 in the heater 55 inhibits transmission of millimeter waves 26 to some extent. For this reason, in the present embodiment, the non-covering sections of the plastic sheet 63, which do not cover the heating element 57, the electrodes 61, or the thermistor 62, include through sections 64. This reduces the attenuation of millimeter waves 26 passing through the plastic sheet 63, as compared to a structure in which the plastic sheet 63 lacks the through sections 64.

When a depression 39 is formed in the rear surface of the front base 36 due to a sink mark, the depressed section becomes thinner than the surrounding section, so that the thickness of the emblem 30 in this section deviates from the thickness T defined by Expression 1. For this reason, the depressions 39 of the present embodiment are filled with the depression-filling sections 43, which are formed of the same plastic as the base 35. Thus, the thickness in the front-rear direction of the emblem 30 in the irradiation region Z1 (FIG. 2) of millimeter waves 26 is closer to the thickness T of Expression 1, as compared to a structure that lacks the depression-filling sections 43. This reduces the influence of the depressions 39, which are formed by sink marks, on the thickness T, further reducing the attenuation of the millimeter waves 26 passing through the emblem 30.

The front and rear bases 36 and 41, which sandwich the main portion 56 of the heater 55 from the front and rear sides, are joined to each other so as to seal the main portion 56, leaving no gaps between the front and rear bases 36 and 41. This helps to prevent water from entering between the front and rear bases 36 and 41 and coming into contact with the main portion 56 of the heater 55.

When snow adheres to the front surface of the emblem 30 and then melts into water, the water runs down along the front surface. This also applies to rain, muddy water, or other substances on the front surface of the emblem 30. For this reason, in the present embodiment, both the electrodes 61 and the thermistor 62 are located at positions higher than the irradiation region Z1 of millimeter waves 26, and are spaced apart from the water running down as described above. This reduces the likelihood of water coming into contact with the electrodes 61 and the thermistor 62, as compared to a structure in which the electrodes 61 and the thermistor 62 are located at positions lower than the irradiation region Z1.

This helps to prevent adverse effects of contact with water, such as corrosion of the electrodes 61 and the thermistor 62.

Further, when the heating element 57 is heated by energization, the temperature of the heating element 57 tends to be lower in a lower section and higher in an upper section.

Based on the detection value of the thermistor 62, the electronic controller controls to energize the heating element 57 so as to adjust the temperature of the heater 55. This reduces degradation of the decorative main body 31 resulting from the heat of the heating element 57.

In this respect, the thermistor 62 of the present embodiment is located at a position higher than the irradiation region Z1 of millimeter waves 26, so that the thermistor 62 detects the temperature of the section of the heating element 57 that has a higher temperature. This reduces the amount of power applied to the heating element 57 as compared to a structure in which the thermistor 62 is located at a position lower than the irradiation region Z1, effectively reducing degradation of the decorative main body 31 resulting from the heat of the heating element 57.

If the front edge 30c of the emblem 30 (the decorative main body 31) is located rearward of the front edge 17a of the lower attachment section 17, a part of the lower attachment section 17 (the curved section 18) protrudes frontward beyond the decorative main body 31. As a result, when the heat of the heater 55 melts some of the snow adhering to the front surface of the emblem 30, the unmelted portion of the snow can accumulate on the protruding section of the lower attachment section 17.

In contrast, as shown in FIG. 3, the front edge 30c of the emblem 30 (the decorative main body 31) of the present embodiment is located frontward of the front edge 17a of the lower attachment section 17. The lower attachment section 17 (the curved section 18) does not protrude frontward beyond the decorative main body 31. As a result, when the heat of the heater 55 melts some of the snow adhering to the front surface of the emblem 30, the unmelted snow does not accumulate on the lower attachment section 17 and falls down.

The present embodiment may be modified as the following modifications. In the modifications, same reference numerals are given to those components that are the same as the corresponding components of the embodiment described above. Such components will not be described in detail.

Figure 8:
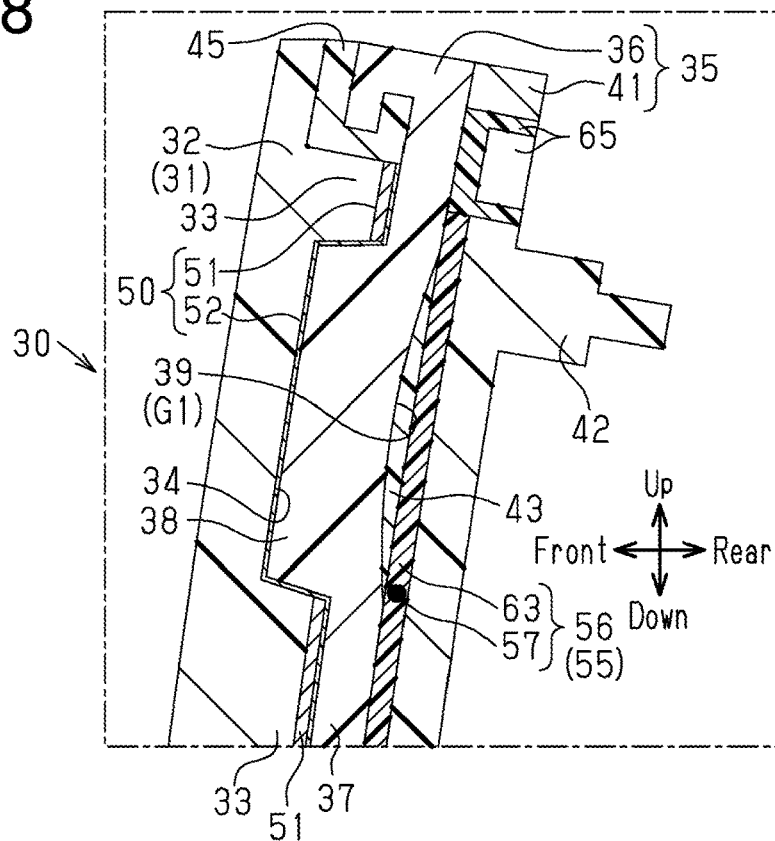
FIG. 8 is a partial cross-sectional view corresponding to FIG. 5 and showing a modification of an emblem.

In the embodiment described above, the depression-filling sections 43 are parts of the rear base 41. However, as shown in FIG. 8, the depression-filling sections 43 may be formed separately from the base 35 using the same plastic as the base 35. In this case, after the front base 36 is molded, the depression-filling sections 43 may be formed by performing plastic molding so as to fill the depressions 39. Alternatively, each depression-filling section 43 may be formed in advance as a separate member having a shape for filling a depression 39, and this depression-filling section 43 may be joined to the depression 39 by a method such as thermal fusion or ultrasonic fusion, after the front base 36 is molded.

In any of the modifications, the main portion 56 of the heater 55 is joined to the rear surface of the front base 36 with the depressions 39 filled with the depression-filling sections 43. When forming the rear base 41, since the depressions 39 are already filled, the through sections 64 connecting to the depressions 39 may be omitted as shown in FIG. 8. Likewise, the through sections 64 that do not connect to the depressions 39 may be omitted. Nevertheless, it is not necessary to omit the through sections 64 that connect to the depressions 39 and the through sections 64 that do not connect to the depression 39.

This configuration still achieves the base 35 that is free of gaps adjoining the main portion 56 of the heater 55, when the rear base 41 is formed.

Figure 9:
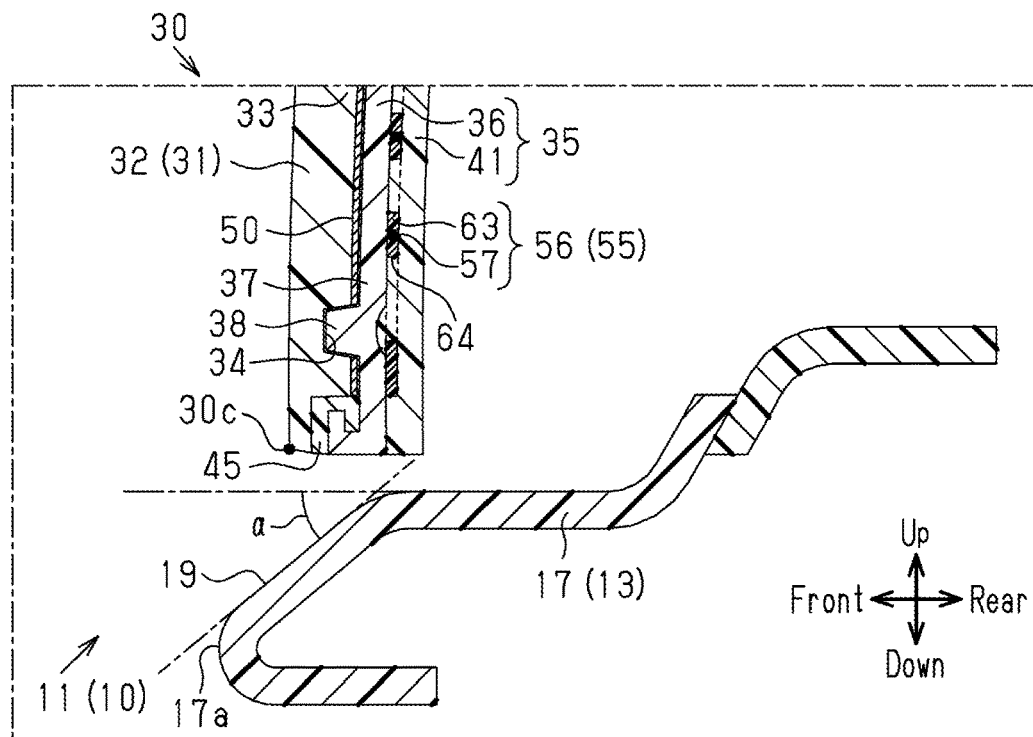
FIG. 9 is a partial cross-sectional view showing a modification of an attachment structure of an emblem to a front grille.

The emblem 30 may be attached to the front grille 11 having a lower attachment section 17 shown in FIG. 9. This lower attachment section 17 has an inclined surface 19, which slopes down toward the front. In this case, the emblem 30 (the decorative main body 31) is attached to the attachment section 13 such that its front edge 30c is positioned above the inclined surface 19 of the lower attachment section 17. The inclined surface 19 forms with a horizontal plane an angle $\alpha$ that is greater than 0° and less than 90°. The angle $\alpha$ is preferably between 10° and 20°.

As such, when the heat of the heater 55 melts some of the snow on the front surface of the emblem 30 into water, the water and the unmelted snow run down along the inclined surface 19. This limits accumulation of snow on the lower attachment section 17.

The millimeter wave attenuation reducing configuration of (2) described above may include a configuration in which only one of the electrodes 61 and the thermistor 62 is incorporated in the heater 55 at a position outside the irradiation region Z1 of millimeter waves 26 in the heater 55.

As the millimeter wave attenuation reducing configuration of (2) described above, at least one of the electrodes 61 and the thermistor 62 may be incorporated in the heater 55 at one side of the irradiation region Z1 or at a position lower than the irradiation region Z1, as long as it is located outside the irradiation region Z1 of millimeter waves 26 in the heater 55.

As the millimeter wave attenuation reducing configuration of (3) described above, the straight sections 58 of the heating element 57 may be incorporated in the heater 55 so as to be inclined relative to the plane of polarization 27 but not perpendicular to the plane of polarization 27. In this case, the area of the sections of the straight sections 58 located in the plane of polarization 27 is still smaller than that in a structure in which the straight sections 58 are parallel to the plane of polarization 27. This reduces the amount of millimeter waves 26 blocked by the straight sections 58, thereby reducing the attenuation amount of millimeter waves 26.

Unlike the embodiment described above, the components of the heater 55 may be incorporated in the heater 55 in only one of the millimeter wave attenuation reducing configurations of (1) to (4), or the components may be incorporated in the heater 55 in a combination of two or more of the millimeter wave attenuation reducing configurations.

In the main portion 56 of the heater 55, a wire heating element of transparent conductive film may be formed on a transparent plastic sheet 63. The heating element of transparent conductive film may be formed by sputtering or vapor deposition, for example, using indium tin oxide (ITO) as a material.

Figure 10:
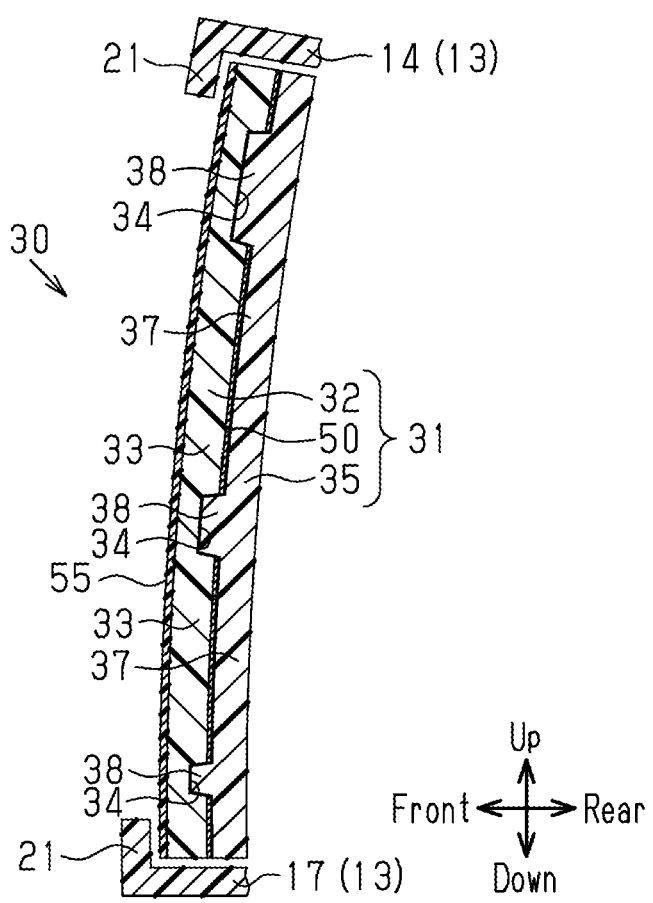
FIG. 10 is a cross-sectional view showing a modification of an emblem.

In this case, since the heating element is less visible, the heater 55 may be located frontward of the decorating layer 50 and the base 35 (the front base 36), for example on the front side of the transparent member 32 as shown in FIG. 10. This is unlikely to compromise the appearance of the emblem 30, which would otherwise result when the heating element is visible. In this modification, it is not necessary to sandwich the heater 55 with the base 35 from the front and rear sides, eliminating the need to divide the base 35.

In addition, the structure described above facilitates the transfer of heat of the heating element of the heater 55 to the snow adhering to the front surface of the emblem 30. The structure thus has an additional advantage of effectively melting snow with the heat of the heater 55. This effect is maximized when the heater 55 is located frontward of the transparent member 32.

This modification requires a structure to hide the electrodes 61 and the thermistor 62. For this reason, as shown in FIG. 10, the attachment section 13 may include a colored vertical wall section 21. The emblem 30 is arranged such that the electrodes 61 and the thermistor 62 are positioned behind the vertical wall section 21. The vertical wall section 21 of the attachment section 13 thus hides the electrodes 61 and the thermistor 62, which are located behind the vertical wall section 21. As such, the electrodes 61 and the thermistor 62 are invisible from the front side of the emblem 30 and unlikely to compromise the appearance of the emblem 30.

The arrangement pattern of the heating element 57 in the heater 55 may be modified from that of the embodiment described above.

The front surface of the component located at the most forward position of the emblem 30 may be provided with water repellency. The component thus repels water on its front surface and is less likely to be wetted, inhibiting formation of water film on the front surface of the component when the snow melts.

To provide water repellency, the front surface of the component may have water repellent film, which may be organic coating film or silicone film. Alternatively, the molding surface of the mold used to form the component may be embossed or nano-machined.

Water repellent film having the function of hard coating may also be used.

To reduce corrosion, the metal layer 52 of the decorating layer 50 may be covered with a corrosion preventing layer made of an acrylic or urethane plastic.

The coupling section 45 may be omitted.

Millimeter waves 26 may be transmitted along the plane of polarization 27 that is parallel to a vertical plane as is the case with the above embodiment, or may be transmitted along the plane of polarization 27 that is inclined relative to a vertical plane.

The decorative main body 31 may be shaped as a plate having a shape different from an elliptical shape.

The emblem 30 may be attached to the attachment section 13 of the front grille 11 in any manner. For example, the emblem 30 may be attached to the attachment section 13 by clips, screws, or claw engagement.

The emblem 30 may be attached to the vehicle body instead of the front grille 11.

The vehicle decorative part does not have to be the emblem 30 as long as it is attached to the vehicle 10 at the front side in the transmission direction of millimeter waves from the millimeter wave radar 25 to decorate the vehicle 10, and has a millimeter wave transparency.

The invention claimed is:

1. A vehicle decorative part comprising:
a decorative main body that is configured to be attached to a vehicle at a front side in a transmission direction of millimeter waves from a millimeter wave radar to decorate the vehicle and has a millimeter wave transparency; and
a heater having a heating element that emits heat when energized, wherein
at least one of components that form the heater is incorporated in the heater in a millimeter wave attenuation reducing configuration that reduces attenuation of the millimeter waves passing through the heater,
the heater includes an electrode and a thermistor, and
as the millimeter wave attenuation reducing configuration, at least one of the electrode and the thermistor is incorporated in the heater at a position outside an irradiation region of the millimeter waves in the heater.

2. The vehicle decorative part according to claim 1, wherein
at least a part of the heating element is located in the irradiation region of the millimeter waves in the heater, and
as the millimeter wave attenuation reducing configuration, the heating element is incorporated in the heater in a condition where an area proportion of an area of a section of the heating element that occupies the irradiation region to an area of the irradiation region is set such that an attenuation amount of the millimeter waves is less than or equal to a permissible value.

3. The vehicle decorative part according to claim 2, wherein as the millimeter wave attenuation reducing configuration, the heating element is incorporated in the heater such that the area proportion is less than or equal to 10% when the permissible value of the attenuation amount of the millimeter waves is 2.5 dB.

4. The vehicle decorative part according to claim 1, wherein at least one of the electrode and the thermistor is incorporated in the heater at a position higher than the irradiation region.

5. The vehicle decorative part according to claim 1, wherein
the heating element includes a plurality of straight sections, which extend parallel to one another, and a folded-back section, which connects ends of adjacent ones of the straight sections to each other,
the millimeter waves are transmitted so as to vibrate in a plane of polarization, and
as the millimeter wave attenuation reducing configuration, the straight sections are incorporated in the heater so as to be inclined relative to the plane of polarization.

6. The vehicle decorative part according to claim 5, wherein as the millimeter wave attenuation reducing configuration, the straight sections are incorporated in the heater so as to be perpendicular to the plane of polarization.

7. The vehicle decorative part according to claim 5, wherein as the millimeter wave attenuation reducing configuration, the folded-back section is incorporated in the heater at a position outside the irradiation region of the millimeter waves in the heater.

8. The vehicle decorative part according to claim 1, wherein
the decorative main body is configured to be attached to an attachment section of the vehicle in an upright position,
the attachment section includes a lower attachment section located below the decorative main body, and
the decorative main body is configured to be attached to the attachment section such that a front edge in the transmission direction of the decorative main body is aligned with a front edge of the lower attachment section or located frontward of the front edge of the lower attachment section.

9. The vehicle decorative part according to claim 1, wherein the decorative main body is configured to be attached to an attachment section of the vehicle in an upright position, the attachment section includes a lower attachment section located below the decorative main body, the lower attachment section has an inclined surface, which slopes down toward a front side in the transmission direction, and the decorative main body is configured to be attached to the attachment section such that a front edge in the transmission direction of the decorative main body is located above the inclined surface of the lower attachment section.

* * * * *